P. CURLEY.
HOPPLE.
APPLICATION FILED NOV. 4, 1916.

1,212,023.

Patented Jan. 9, 1917.

Inventor
Patrick Curley.

UNITED STATES PATENT OFFICE.

PATRICK CURLEY, OF GOSHEN, NEW YORK.

HOPPLE.

1,212,023.      Specification of Letters Patent.      Patented Jan. 9, 1917.

Application filed November 4, 1916. Serial No. 129,565.

*To all whom it may concern:*

Be it known that I, PATRICK CURLEY, a citizen of the United States, residing at Goshen, in the county of Orange and State of New York, have invented certain new and useful Improvements in Hopples; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hopples and the object in view is to produce a means whereby the legs of the animal equipped with the hopple may be protected by the employment of a wheel about which the hopple strips pass and thus dispensing with the hopple rings.

The invention consists of a simple and efficient device of this nature having various details of construction, combinations and arrangements of parts which will be hereinafter fully described, shown in the accompanying drawings and then specifically defined in the appended claims.

Figure 1:
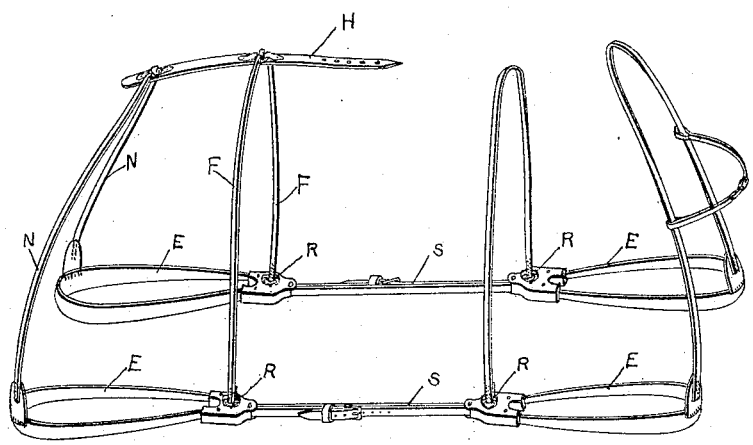
Figure 2:
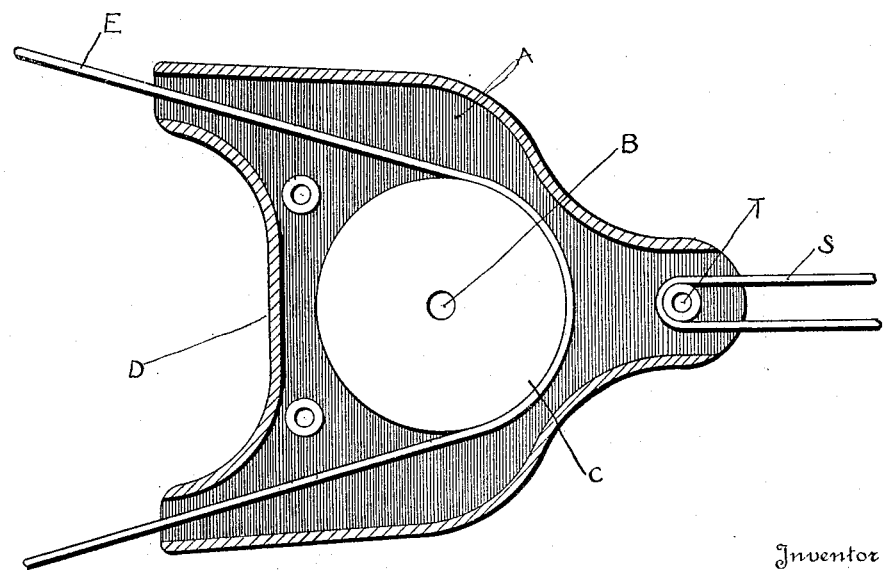

My invention is illustrated in the accompanying drawings, in which:

Figure 1 is a perspective view of a hopple made in accordance with my invention. Fig. 2 is a sectional view through the casing.

Reference now being had to the details of the drawings by letter, A designates a casing in which a shaft B is journaled, and C is a pulley journaled upon said shaft within the casing. One end of the casing is concaved as at D to receive the leg of an animal.

The hopple straps are designated by letter E and each of these straps passes about a pulley, there being four of said pulleys of similar construction, and a corresponding number of casings mounted one for each leg of the animal. The back straps F are fastened to a central strap H which in turn is fastened to the straps N which support the outer ends of the hoples. Said straps F are secured to the eyes R, fastened to each of the casings, the latter being supported in horizontal planes, as shown. The adjacent projecting ends of the casings are contracted and carry shafts T around which pass connecting straps S. The straps S are adjustable in length to vary the distance between the castings upon each side of the hopple.

By the provision of a device embodying the features of my invention, it will be noted that the hopple rings are dispensed with and the friction incident to the movements of the hopple is reduced to a minimum by passing about pulleys in the manner shown.

What I claim to be new is:—

1. A hopple comprising casings, pulleys journaled therein, hopple straps movable through said casings and about said pulleys, and back straps secured to the casings, the casings being provided with ends which are concaved to receive the legs of an animal.

2. A hopple comprising two sets of casings, pulleys journaled one in each casing, each casing having openings at one end, hopple straps movable through said openings and passing about said pulleys, eyes upon the casings, back straps secured to said eyes, and adjustable strap connections between the casings of each set.

In testimony whereof I hereunto affix my signature in presence of two witnesses.

PATRICK CURLEY.

Witnesses:
     ARTHUR A. STEVENS,
     P. R. GRIFFIN.

Copies of this patent may be obtained for five cents each, by addressing the "Commissioner of Patents, Washington, D. C."